(12) United States Patent
Greene, Jr. et al.

(10) Patent No.: US 9,817,445 B1
(45) Date of Patent: Nov. 14, 2017

(54) MOBILE DEVICE CASE

(71) Applicants: James Irvine Greene, Jr., Pulaski, TN (US); Jason Rogers, Pulaski, TN (US)

(72) Inventors: James Irvine Greene, Jr., Pulaski, TN (US); Jason Rogers, Pulaski, TN (US)

(*) Notice: Subject to any disclaimer, the term of this patent is extended or adjusted under 35 U.S.C. 154(b) by 0 days.

(21) Appl. No.: 15/251,530

(22) Filed: Aug. 30, 2016

Related U.S. Application Data

(63) Continuation-in-part of application No. 14/519,259, filed on Oct. 21, 2014, now abandoned.

(60) Provisional application No. 61/920,081, filed on Dec. 23, 2013.

(51) Int. Cl.
| | |
|---|---|
| *G06F 1/16* | (2006.01) |
| *H04B 1/3888* | (2015.01) |
| *G01J 5/04* | (2006.01) |
| *G01R 19/00* | (2006.01) |
| *G01R 15/12* | (2006.01) |

(52) U.S. Cl.
CPC ............. *G06F 1/1656* (2013.01); *G01J 5/04* (2013.01); *G06F 1/1616* (2013.01); *H04B 1/3888* (2013.01); *G01R 15/12* (2013.01); *G01R 19/0084* (2013.01)

(58) Field of Classification Search
CPC .......................................................... G06F 1/16
USPC ....................................................... 361/679.01
See application file for complete search history.

(56) References Cited

U.S. PATENT DOCUMENTS

| | | | |
|---|---|---|---|
| 2005/0264988 A1* | 12/2005 | Nicolosi ............... | G06F 1/1626 361/679.44 |
| 2006/0007645 A1* | 1/2006 | Chen .................... | G06F 1/1626 361/679.04 |

\* cited by examiner

*Primary Examiner* — Jerry Wu
(74) *Attorney, Agent, or Firm* — Miller & Martin PLLC; Stephen J. Stark

(57) ABSTRACT

An improved case for use with a computing device provides at least one sensor, preferably for use with a processor of the computing device. For many embodiments, the computing device has a storage configuration with the computing device located below an upper surface of the case and a lifted configuration with the computing device supported at an angle alpha with a portion extending above the upper surface of the case.

15 Claims, 3 Drawing Sheets

MOBILE DEVICE CASE

CLAIM OF PRIORITY

This application is a continuation-in-part of U.S. patent application Ser. No. 14/519,259 filed Oct. 21, 2014 which claims the benefit of U.S. Provisional Patent Application No. 61/920,081 filed Dec. 23, 2013, both of which are incorporated herein by reference in their entirety.

FIELD OF THE INVENTION

The present invention relates to cases for use with mobile computing devices such as smart phones, tablet computers and/or other devices.

BACKGROUND OF THE INVENTION

Smart phones, tablets and the like have come a long way. Internal sensors allow for GPS sensing as well as gyro sensing which can be incorporated into software applications such as navigation apps, distance measuring apps, games and/or other software applications which use data from the internal sensors.

External sensors or at least a light diffusion dome, to enable a cell phone to function as a light detector sensor are presently being sold by Luxi™ online. This device appears to use an onboard illuminance sensor of the phone but the accessory provides a dome to cooperate in diffusing light at the sensor. Other external sensors for use with smart phones include the SensorDrone (see at www.sensordrone.com) which provides 11 sensors which provide signals to a smartphone when connected, namely a light sensor, a precision gas sensor (air quality, carbon monoxide levels, blood alcohol content), an oxidizing gas sensor (ozone sensing and chlorine leaks), a reducing gas sensor (methane propane or natural gas leak detector), a non-contact thermometer, a humidity sensor, a temperature sensor, a color sensor, a pressure sensor (barometer or altimeter), a proximity sensor (a stud finder or liquid level monitor)) and an expansion connector for connecting to other sensors (like EKGs, Thermal Printers and others cooperating with a digital TTL UART or i2C format or analog (0-3V)). These are provided in a wafer-like construction having a width of 1.1 inches, a thickness of ½ inch and a length of 2⅔ inches. This device is advertised as using Bluetooth™ wireless technology to connect to a mobile device.

While the SensorDrone is certainly an interesting electrical device, it appears to be a collection of sensors for the user to figure out what to do with it. It does not appear to be directed to any particular industry, and provides a sense of, "you might like this if you can figure out what to do with it." You also have to keep up with it as a separate device.

What is needed is a device better tailored to the construction/electrical industry and/or others. A need is believed to exist for an improved sensor platform for use with mobile devices. Another need is believed to exist for an improved case for use with mobile devices. Still another need is believed to exist for an improved sensor system for use by those monitoring construction conditions.

SUMMARY OF THE INVENTION

It is an object of many embodiments of the presently preferred embodiment to provide a case which connects to a mobile device and provides at least one, if not a plurality of sensors, which cooperate with the mobile device to provide at least one measuring device.

It is an object of many embodiments of the present invention to provide a plurality of coordinate electrical sensors for use with a mobile computing device.

It is an object of many embodiments of the present invention to provide at least one measuring and/or sensing device connected to a mobile device by a case, while still, for at least some embodiments, providing a display apart from the mobile device.

It is an object of many embodiments of the present invention to provide a case which houses meter leads when not in use in a storage compartment for use with at least one of a voltage meter and/or an electrical multimeter when not in use.

It is yet another object of many embodiments of the present invention to provide a case for use with a mobile electric device where the device pivots upwardly from a bottom to a display position with the case remaining flat on a surface, and then pivots downwardly to a storage configuration for protection by the case.

It is yet another object of many embodiments of the present invention to provide a multi-sensor having a combination of at least some of a non-contact voltage sensor, a voltmeter or multimeter, a light metering device, an electronic distance measuring device, an infrared temperature sensor.

Accordingly, in accordance with a presently preferred embodiment of the present invention, an embodiment is provided as a electronic mobile device case is provided which may either work with the mobile device, such as with connection either wired, such as through a communications/charging port, USB port and/or other connection, or wirelessly, through Bluetooth™ connection or other wireless method.

The preferred embodiment, whether able to be used as a case or otherwise, may provide a combination of sensors, such as at least a combination of some of a voltage non-contact sensor, a multimeter/volt meter sensor, a non-contact temperature sensor, an electronic or laser distance meter, a light metering device, and/or other sensors. Furthermore, for at least some embodiments, a first display may be provided with the device. First display may be in addition to a separate display of the mobile computing device, if used. Additionally a first battery may be employed for at least some embodiments which may be in addition to a battery of a mobile computing device. Other embodiments may draw power from the mobile computing device via a connection, such as one of the connections described above or others.

As a case, the preferred embodiment may provide a storage compartment below the mobile device in a stored configuration thereby securing access into the storage compartment, such as where the meter leads may be stored. In a raised configuration, the mobile device may be lifted, such as by pivoting or otherwise, to then allow access into the storage compartment for at least some embodiments, if provided, and/or provide an angled viewing platform for being able to view the screen of the mobile computing device at an angle. It will be understood by those of ordinary skill in the art that not only cell phones, such as smart phones usable with such as case, but also tablets and/or possible other computing devices.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
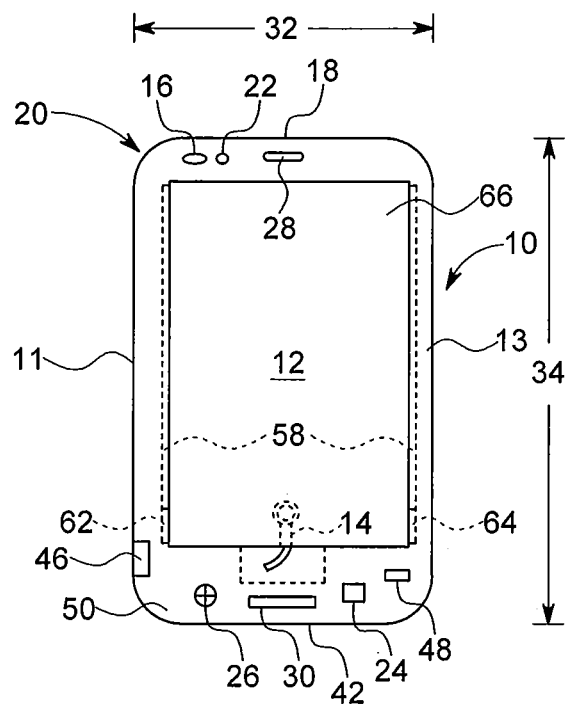
FIG. 1 is a top plan view of a presently preferred embodiment of the invention.

FIG. 1 shows a case 10 of a presently preferred embodiment of the present invention with a mobile electronic computing device 12 installed therein and a USB or other connection 14 shown in phantom. The connection 14 is useful for at least some embodiments to provide a data connection of various sensors (as will be described below) in connection with the device 12, if not also to provide power from either the device 12 to the sensors or from the case 10 to the device 12, such as if a need for backup power became desirable or other scenario.

Case 10 is preferably substantially rectangular having side 11,13 that extend beside sides 25,27 of computing device 12 when in a storage configuration. Top 21 and bottom 23 may connect to sides 25,27 to preferably assist with providing a planar upper surface 54 for at least some embodiments. Top 21 and bottom 23 may be covered by case 10 as shown for at least some embodiments in a storage configuration. Case 10 or at least portions thereof, may be somewhat resilient, if dropped. A back 19 preferably assists in defining cavity 72 as described below.

Case 10 preferably houses at least one, if not a plurality of sensors which are in communication with computer device 12, either wired such as with connection 14 or wirelessly, such as with a Bluetooth™ or other connection as is known in the art. First sensor 16 may be a non-contact voltage sensor. By providing the non-contact voltage sensor as first sensor 16 near an edge 18 and/or corner 20 of the case 10, such as in combination with an indicator light 22, the case may easily be positioned near a potential electrical source, such as an outlet for the user to detect whether or not there is a voltage source providing electrical power at the potential electrical source. Selector switch 26 may be useful to select which of the various sensors, such as first sensor 16 are to be currently in use, of course, it may be that the computing device 12 may be used as a selector switch 26 for various embodiments, such as by selecting a particular software application or otherwise. No non-contact voltage meters are known to possibly use the processor of a computing device 12 to operate, like at least some preferred embodiments.

Computing device 12 may be a smart phone, tablet computer or any other computing device suitable for such use as would be understood by those of ordinary skill in the art.

Test button 24 may be useful to activate some of the sensors, such as second and/or third sensors 28,30 which are illustrated as an infrared temperature sensor (second sensor 28) and a electronic distance measurement device (third sensor 30). The second sensor 28 may be a contact, integral and/or non-contact thermometer device as are relatively well known in the art, but are not known to be integrated into a case 10 as will be described further below. The third sensor 30 is shown to be an electronic distance meter or measurement device which, as would be understood by those of ordinary skill in the art, can involve laser distance measurement, such as for a contractor to measure a particular distance in a room.

Second and third sensors 28,30 are shown centrally disposed relative to width 32 of case 10 for at least some embodiments and on opposite sides of the case 10 for at least some embodiments. Furthermore, for at least some embodiments, second and third sensors 28,30 are located near or at an edge 18 of the case 10. Other embodiments may locate second and/or third sensors 28,30 in different locations. Furthermore, it may be that second and/or third sensors 28,30 work with a processor such as processor 38 which might provide a signal through connection 14 and/or use a processor in the computing device 12 such as through the use of a software application or otherwise possibly to display on display 40. Second and third sensors respectively are directed toward rear and front 90,92 of case 10. In fact, second and third sensors 28, 30 are located on rear and front 90,92 respectively for many embodiments, such as the embodiment illustrated. Thus, as illustrated, the sensors 28,30 can be described as being perpendicularly oriented relative to a screen 96 of the computing device 12 when in the storage configuration.

Second and third sensors 28,30 are also shown at about a midpoint of a height 36 for at least some embodiments such as along edges 18,42. Test button 24 or other activation device whether as a part of the case 10 or a part of the computing device 12 may be activated to start the use of the second and/or third sensor(s) 28,30 for the desired measurement. Display may occur on first display 66 on case 10 or on a display of the computing device 12, which for many embodiments will provide one.

First battery 44 may be useful to provide power for first, second, third 16, 28,30 and/or other sensors as will be discussed below while also potentially providing backup if not regular power to computing device 12. First battery 44 may be rechargeable battery for at least some embodiments and charging port 46 may be desirable at least for some embodiments. Alternatively and possibly concurrently a battery of the computing device 12 may be used to power the case 10 and/or at least some if not all of various sensors and/or other components, possibly using charging port 46 or other port for such purpose. Charging port 46 may be a USB or other connection which may also allow for the communication of data from the case 10 externally relative to both the case 10 and/or computing device 12. Charging port 46 may also communicate with other devices in various embodiments with case 10 and/or computing device 12.

Fourth sensor 48 is illustrated as a light metering device, but could be another type of sensor for other applications, if utilized at all. This sensor is also shown disposed directed upwardly (like first sensor 16) and possibly forwardly (like third sensor 30) such as along the front edge 50 of the case 10. Other locations could be employed for other embodiments. Fourth sensor 48 is also shown near a corner 52, which is opposite corner 20, but could be other locations for other embodiments.

Figure 3:
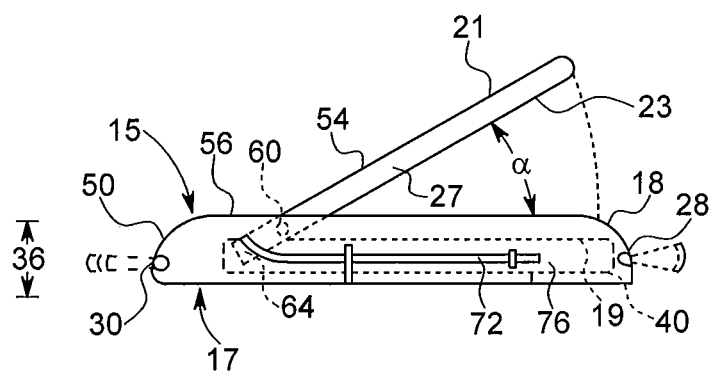
FIG. 3 is a side plan view of the embodiment of FIG. 1 in an angled configuration.
Figure 4:
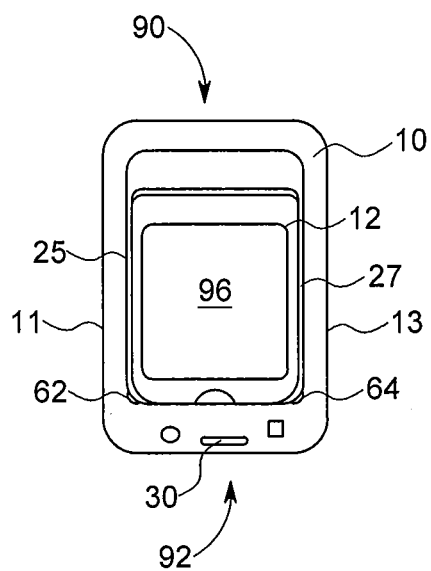
FIG. 4 is a top plan view like FIG. 1 with a mobile electronic computing device 12 angularly connected thereto as shown in FIG. 3.
Figure 5:
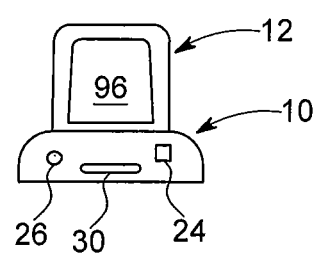
FIG. 5 is a front plant view showing consistency with FIGS. 3 and 4.
Figure 6:
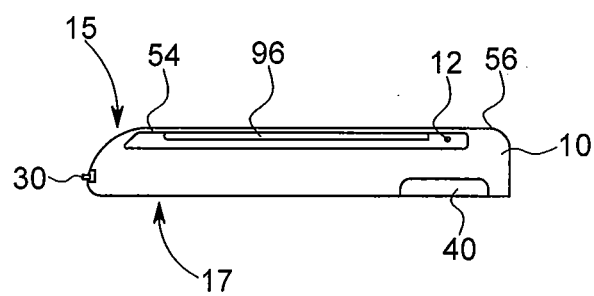
FIG. 6 is a side plan view of the embodiment of FIG. 1 in a storage configuration.

As shown in FIG. 3, when computing device 12 is in a storage configuration (shown in dotted lines) an upper surface 54 (i.e., an uppermost surface for many embodiments can be located below an upper surface 56 (i.e., an uppermost surface for many embodiments) of the case 10 to potentially assist in protecting the computing device 12.

Figure 2:
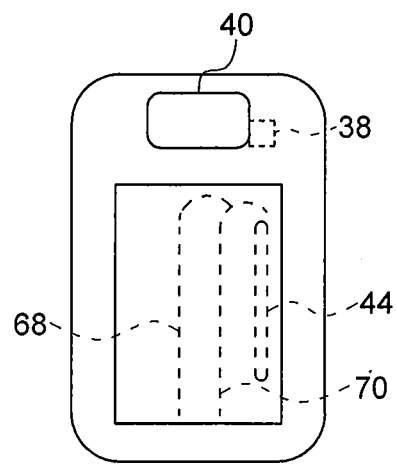
FIG. 2 is a bottom plan view of an alternatively preferred embodiment similar to the embodiment shown in FIG. 1.

Furthermore, lips 58 may be useful in overhanging the computing device 12 as would be understood by those of ordinary skill in the art. Lips 58 may be somewhat resilient in nature to facilitate directing the computing device 12 into the stored configuration as shown in FIG. 2 and in phantom in FIG. 3.

There then at least two options for placing the computing device in the lifted configuration shown in FIG. 3. Specifically the computing device 12 may be pivotably connected such as at pivot 60 to allow for rotation to the desired position as shown in FIG. 3, and/or possibly (if not performed by some other means), the computing device may be inserted into opposing slots 62,64 which can hold the computer at the angle α The angle α may be pre-determined or may be adjustable for at least some embodiments but is at least one degree in the rifled position so that upper surface 54 is above upper surface 56. Preferably α is at least 5-10 degrees if not about 30 degrees or up to 90 degrees as illustrated. 45 degrees has also been possible for some embodiments. By allowing the computing device to pivot and/or otherwise be turned to be angled at angle α relative to the case 10, the user can view a screen 66 of the computing device 12 such as if used as a meter and/or for other purposes as would be understood by those of ordinary skill in the art.

When in an angled or lifted configuration, it is preferable for at least some embodiments for the computing device 12 to be located within a cross section or volume beginning with the cross section and extending vertically of the top 15, bottom 17 and sides 11,13 as illustrated.

Presently, no manufacturers are known to provide such a case 10 in accordance with many preferred embodiments. When in the lifted configuration shown in FIG. 3, the leads 68,70 if in cavity or compartment 72, which if utilized, may be under a bottom surface of the computing device 12 (i.e., bottom most surface for many embodiments) The leads 68,70 can then be removed from compartment 72 and used such as with the computing device 12 as a multimeter and/or with a sensor 74 to provide such a capability. Leads 68,70 may be stored in other locations either connected to case 10 or remotely for other embodiments, if at least some multimeter functions are to be provided by various embodiments.

Compartment 72 preferably provides a contained cavity 76 which may be useful to store other devices like pens, pencils, stylus, personal effects like credit cards and/or anything else which could fit in the cavity 76. Cavity 76 may or may not be water tight when in the storage configuration which may be useful for at least some embodiments.

Various embodiments may have various numbers of sensors 16,28,30,48,74 and/or others. Incorporating a sensor such as any of sensors 16,28,30,48 and/or 74 into a case 10 is believed to be new, particularly how the applicant has decided to do it. Some embodiments may have a test button 24, while other embodiments may use software of the computing device 12 to provide an ability to activate any of the sensors 16,28,30,48, and/or 74. Selector switch 26 may also be provided for some embodiments if not provided with the computing device 12 by at least some means.

Providing a communication connection 14 between a case 10 and a computing device 12 may also be novel for at least some embodiments. This could be true particularly for embodiments having a first battery 44 which may be used to provide power through connection 14 to computing device 12 such as back up power or for other purposes. Connection 14 may be paired with port 46 to provide data and/or communication from computing device 12 to external devices for at least some embodiments, but of course wireless communication may be achievable through Bluetooth™ or other technology either or between any of the case 10, the computing device 12 and/or other devices.

Providing certain sensors in cooperation with a computing device 12 is believed to be novel. For instance a distance measuring sensor is not known by the applicant to cooperate with a computing device 12 such as a smart phone, particularly when using the computing device's processor.

The case 10 is shown extending above, below, past both sides, past front and back of computing device 12 when in the storage configuration. Other embodiments may take on different forms.

A case 10 can take various embodiments, some having a first display 40 separate from a display of the computing device 12. Some also have a separate first battery 44 from the computing device 12.

Front 92 may provide a curved edge 94 onto which third sensor 30 is provided. Sensor 30 may be perpendicularly oriented relative to screen 96 of computing device 12 when in the storage configuration. The angle would be (90—alpha) when in the angled position shown in FIG. 3.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A computing device case in combination with a computing device comprising: a computing device case having an uppermost surface and four sides formed an opening which extend adjacently relative to four sides of a removably connected computing device in a storage configuration with said uppermost surface located above an uppermost surface of the computing device in the storage configuration, the uppermost surface spanning the sides and having a curved front edge and a curved rear edge and opposing slots located on opposite ends of one of the sides;

and a lifted configuration, whereby the computing device is held by the opposing slots of the case at an angle (alpha) relative to the uppermost surface and extends above the uppermost surface of the computing device case; said computing device case having at least one sensor supported thereon in communication with the computing device; the at least one sensor located on the curved front and rear edges and formed a horizontal plan with a screen of the computing device when in the storage configuration; and wherein the at least one sensor is selected from the group of a non-contact voltage sensor, a voltmeter, a multimeter, a light meter device, an electronic distance measuring device and an infrared temperature sensor.

2. The computing device and case combination of claim 1 wherein the at least one sensor provides data to a processor of the computing device for reporting test results.

3. The computing device and case combination of claim 2 wherein the case further comprises a top and a bottom connected to the sides, and when in the lifted configuration, the computing device is within a volume defined by a cross section of the top, bottom and sides of the case extending vertically upwardly.

4. The computing device and case combination of claim 3 wherein the case has a back, and when in the lifted configuration, a cavity is exposed, said cavity having testing leads stored therein in the storage configuration, and the at least one sensor including selected from the group of at least one of a volt meter and a multimeter.

5. The computing device and case combination of claim 4 wherein the case has a top and a bottom connected to the sides and the back completely extends between the top and bottom as well as the sides to prevent access from below into a perimeter defined by the top, bottom and sides.

6. The computing device and case combination of claim 1 wherein the sides of the case are pivotably connected to the computing device thereby allowing the computing device to pivot relative to the case in transition from the storage to the lifted configuration.

7. The computing device and case combination of claim 1 wherein the sides of the case are received in opposing slots in the sides in the lifted configuration.

8. The computing device and case combination of claim 1 further comprising an electrical connection connecting the case to the computing device with at least one wire.

9. The computing device and case combination of claim 1 further comprising a first battery connected to the case separate from a battery of the computing device.

10. The computing device and case combination of claim 1 further comprising a first screen viewable at along a surface of the case separate from a screen of the computing device.

11. The computing device and case combination of claim 1 wherein the computing device is selected from one of a tablet computer and a smart phone.

12. The computing device and case combination of claim 1 further comprising at least two sensors as a portion of the computing device case, and a selector switch on the case for electing which of the at least two sensors to be in operation.

13. The computing device and case combination of claim 1 further comprising a test button on the computing device case to activate one of the at least one sensor to initiate a measuring test procedure.

14. A computing device case in combination with a computing device comprising: a computing device case having an uppermost surface and four sides formed an opening which extend adjacently relative to four sides of a removably connected computing device in a storage configuration with said uppermost surface located above an uppermost of the computing device in the storage configuration, the uppermost surface spanning the sides and having a curved front edge and a curved rear edge and opposing slots located on opposite ends of one of the sides;

and a lifted configuration, whereby the computing device is held by the opposing slots of the case at an angle (alpha) relative to the uppermost surface and extends above the uppermost surface of the computing device case;

said computing device case having at least one sensor supported thereon in communication with the computing device, the at least one sensor located on the curved front and rear edges and formed a horizontal plan with a screen of the computing device when in the storage configuration; and wherein the at least one sensor is selected from the group of a non-contact voltage sensor, a voltmeter, a multimeter, a light meter device, an electronic distance measuring device and an infrared temperature sensor; and said at least one sensor perpendicularly directed relative to the screen of the computing device when in the storage configuration so as to be oriented to be directed from the front edge of the case.

15. The computing device and case combination of claim 14 wherein when in the lifted configuration, the computing device is within a volume defined by a cross section of a top, a bottom and the sides of the case extending vertically upwardly.

* * * * *